United States Patent
Komanduri et al.

(10) Patent No.: US 10,140,932 B2
(45) Date of Patent: Nov. 27, 2018

(54) SIMULTANEOUS WIDE LIGHTING DISTRIBUTION AND DISPLAY

(71) Applicant: ABL IP Holding LLC, Conyers, GA (US)

(72) Inventors: Ravi Kumar Komanduri, Brambleton, VA (US); David P. Ramer, Reston, VA (US); Guan-Bo Lin, Reston, VA (US)

(73) Assignee: ABL IP Holding LLC, Conyers, GA (US)

( * ) Notice: Subject to any disclaimer, the term of this patent is extended or adjusted under 35 U.S.C. 154(b) by 74 days.

(21) Appl. No.: 15/468,626

(22) Filed: Mar. 24, 2017

(65) Prior Publication Data

US 2018/0277048 A1 Sep. 27, 2018

(51) Int. Cl.
*G09G 3/34* (2006.01)
*F21V 8/00* (2006.01)
*G09G 3/3208* (2016.01)
*G02F 1/137* (2006.01)

(52) U.S. Cl.
CPC ........... *G09G 3/3426* (2013.01); *G02B 6/005* (2013.01); *G02B 6/0051* (2013.01); *G02B 6/0078* (2013.01); *G02F 1/137* (2013.01); *G09G 3/3208* (2013.01); *G09G 2320/0626* (2013.01)

(58) Field of Classification Search
CPC ...... G08G 1/142; G08G 1/0969; G08G 1/144; G08B 5/38; G08C 23/02; H04B 10/116; H04B 37/0227; H04B 37/0272
See application file for complete search history.

(56) References Cited

U.S. PATENT DOCUMENTS

| 5,106,181 A * | 4/1992 | Rockwell, III ...... G02B 6/0026 385/1 |
| 2007/0159471 A1 * | 7/2007 | Lee .................. G02F 1/195 345/204 |
| 2008/0246705 A1 * | 10/2008 | Russell ............. G02B 26/0833 345/82 |

OTHER PUBLICATIONS

Fraunhofer-Gesellschaft, Sky light sky bright-in the office, Research News, Jan. 2012—Topic 1. Retrieved from http://www.fraunhofer.de/en/press/research-news/2012/january/sky-light-sky-bright.html, dated Jan. 2, 2012, 2 pages.

(Continued)

*Primary Examiner* — Shaheda Abdin
(74) *Attorney, Agent, or Firm* — RatnerPrestia

(57) ABSTRACT

A luminaire includes a light waveguide grid including an array of waveguides coupling respective illumination light source emitters of a general illumination device with respective gaps between respective pixel light emitters of an image display device. Each waveguide has a housing that includes an input interface optically coupled to the respective illumination light source emitter to steer illumination lighting from the illumination light source emitter. The housing also includes an output interface opposing the input interface and optically coupled to one or more gaps between pixel light emitters. The housing further includes at least one reflective wall having an internal reflective surface encompassing and extending from the input interface and the output interface. The structure of the waveguide may be optimized and/or additional technologies added to reduce optical losses and improve overall illumination efficiency of the luminaire.

20 Claims, 7 Drawing Sheets

(56) References Cited

OTHER PUBLICATIONS

Matthias Bues et al., "Convergence and Display: Opportunities, Requirements, Challenges", Fraunhofer Institute for Industrial Engineering (IAO), Stuttgart, Germany, SID 2016 Digest,ISSN0097-966X/16/4701-0110-$1.00 © 2016 SID, pp. 110-113, 4 pages.

* cited by examiner

SIMULTANEOUS WIDE LIGHTING DISTRIBUTION AND DISPLAY

TECHNICAL FIELD

The present subject matter relates to examples of a luminaire, that incorporates both illumination light sources and a display. The present subject matter also encompasses a system that includes such a luminaire.

BACKGROUND

Lighting equipment for illumination and displays for image output have fundamentally different requirements, for example, for consumer applications.

Electrically powered artificial illumination lighting has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

The optical distribution of the light output in the luminaire, however, typically is fixed. Various different types of optical elements are used in such lighting devices to provide different light output distributions, but each type of device has a specific type of optic designed to create a particular light distribution for the intended application of the lighting device. The dimming and/or color control features do not affect the distribution pattern of the light emitted from the luminaire.

There also have been proposals to use displays or display-like devices mounted in or on the ceiling to provide variable lighting. The Fraunhofer Institute, for example, has demonstrated lighting equipment using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices typically have been optimized for image output and do not provide particularly good illumination for general lighting applications. A display typically has a Lambertian output distribution over substantially the entire surface area of the display screen, which does not provide the white light intensity and coverage area at a floor or ceiling height offered by a similarly sized ceiling-mounted light fixture.

Liquid crystal displays (LCD) also are rather inefficient. For example, backlights in LCD televisions have to produce almost ten times the amount of light that is actually delivered at the viewing surface. Therefore, any LCD displays that might be used as lighting products need to be more efficient than typical LCD displays for the lighting device implementation to be commercially viable.

Projection displays are typically cost effective alternatives to direct-view displays such as LCDs, when large area and high brightness are desired. But the color quality and light distribution from prior projection displays are not sufficient for general lighting applications.

Examples of other uses of lighting in combination with display technologies include various configurations of signage that include light sources as backlighting that are positioned behind a design feature such a diffuser or screen with an image or wording. Examples of such backlit signage includes advertising signs, door exit signs and other examples of signage that would benefit from backlighting. Some of the signs may be controllable to change wording or an image presented on the display device of the sign. In some instances of advertising signage, a transparent display can be used to provide advertising without obstructing a view of either the interior of a store when viewed from the exterior or vice versa, as well as providing an easily changeable design. However, backlit signage without additional lighting is not typically configured to provide general illumination that complies with governmental regulations and industry standards applicable to the environment in which the signage is installed.

SUMMARY

Hence, there is room for further improvement in luminaires that offer both general illumination capabilities and controllable image display capabilities and systems that incorporate such luminaires. Examples of a lighting and display type luminaire use relatively transparent display devices. In such a luminaire, one or more light transmissive areas of the display device is coupled to an output of a light source of a general illumination device.

In a first example, a luminaire includes a general illumination device for illumination of a space. The general illumination device further includes an array of illumination light source emitters controllable to emit illumination lighting for the space. The luminaire also includes an image display device configured to display an image.

The image display device of the luminaire includes a pixel matrix including an array of pixel light emitters. Each pixel light emitter is controllable to emit light for a respective pixel of the displayed image. The image display device includes gaps amongst the pixel light emitters of the pixel matrix.

The luminaire further includes a light waveguide grid including an array of waveguides coupling a respective illumination light source emitter of the general illumination device with at least one respective gap between two or more of the pixel light emitters of the image display device. Each waveguide has a housing that includes an input interface optically coupled to the respective illumination light source emitter to steer illumination lighting from the illumination light source emitter. The housing also includes an output interface opposing the input interface and optically coupled to the at least one respective gap between the pixel light emitters. The housing further includes at least one reflective wall having an internal reflective surface encompassing and extending from the input interface and the output interface.

In a second example, a software configurable luminaire provides simultaneous wide light distribution and display through the same area. An example of such a configurable luminaire includes an image display device, such as an emissive display, and a general illumination device that includes an array of emitters for illumination. The luminaire uses a light waveguide grid arrangement that is a supporting grid of rows and columns with intersection points and hollow sections. Each of the hollow sections is bounded by walls of individual structural members (e.g., a respective waveguide) of the light waveguide grid meeting at individual intersection points. In the specific example, display light emitters are mounted or formed at the intersection points of the light waveguide grid structure. Alternatively, gaps are mounted or formed between the intersection points of the light waveguide grid structure. The image display device has a matrix of display light emitters that can be formed on a support structure framework, such as a transparent substrate, e.g., for Organic Light-Emitting Diodes (OLEDs). The illumination light emitters are coupled to the hollow sections of the display matrix, in this case, by one of several different types of light diffusion optics.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Figure 1:
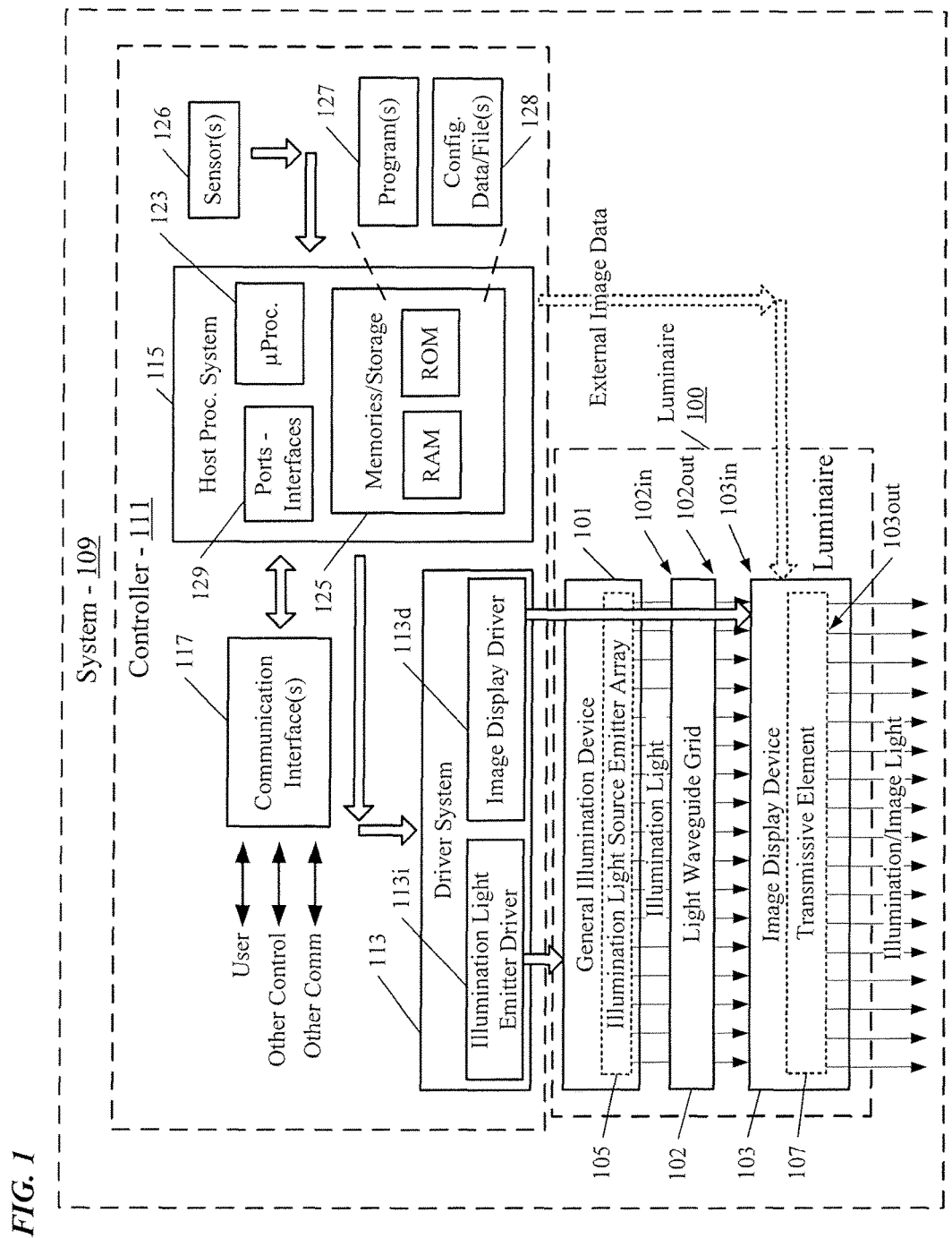
FIG. 1 is a functional block diagram of an example of a system in which a luminaire includes a lighting device for general illumination, an image display device, and a light waveguide grid.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to luminaires that offer both general illumination capabilities and controllable image display capabilities and systems that include such luminaires. Examples of an illumination lighting and display type luminaire use relatively transparent display devices. In such a luminaire, a light transmissive area of a display device is coupled to outputs of light emitters of a general illumination device.

Such a luminaire, for example, may enable either lighting with a fixed distribution, or a display showing a user selected image in a display state, by using the lighting component that is transparent and placed over the image-light output of a full color display.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting," as used herein, are intended to encompass essentially any type of lighting that a device produces light by processing of electrical power to generate the light. A luminaire for an artificial lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The luminaires discussed in further detail below support both artificial lighting for general illumination applications and controllable display capabilities. For that purpose, such a luminaire includes a general illumination device and a display for generating light forming an image output. The general illumination device includes the source emitters of illumination light within the luminaire. The display or at least a portion/element thereof is transmissive or sufficiently transparent to enable illumination from the source emitters of the general illumination device to pass through so that illumination light output emerges from the same output surface as display image light output from the luminaire.

The term "coupled" as used herein refers to any logical, optical, physical or electrical connection, link or the like by which signals or light produced or supplied by one luminaire element are imparted to another coupled element. Unless described otherwise, coupled elements or devices are not necessarily directly connected to one another and may be separated by intermediate components, elements or communication media that may modify, manipulate or carry the light or signals.

In addition to a displayed image, light output from the luminaire may carry information, such as a code (e.g., to identify the luminaire or its location) or downstream transmission of communication signaling and/or user data. The light based data transmission may involve modulation or otherwise adjusting parameters (e.g., intensity, color characteristic, pulse frequency, or distribution) of the illumination light output from the luminaire and/or the image light output of the display device.

Reference now is made in detail to the examples illustrated in the accompanying drawings and discussed below. FIG. 1 illustrates an example of a luminaire 100 as part of a controllable lighting system 109 that also includes a controller 111. In the simplified block diagram example, the luminaire 100 includes a general illumination device 101, a light waveguide grid 102, and an image display 103. Elements 101-103 are collocated or integrated together into a sandwiched unit to form an array of combined lighting elements; and devices 101 and 103 are controlled by the respective control signals received from a driver system 113.

General illumination device 101 provides illumination lighting in response to lighting control signals received from the driver system 113i, for example, based on an illumination application (stored as program(s) 127). In an example, the general illumination device 101 includes layers forming an illumination light source emitter array 105 comprised of light emitting diodes (LEDs). The LEDs extend at least substantially across a panel of the general illumination device 101 forming a matrix of illumination pixels extending at least substantially across the panel area(s) of the general illumination device 101.

The transparent image display device 103 provides image light in response to image control signals received from the driver system 113d. In addition or alternatively, the image data may be provided to the image display device 119 from an external source(s) (not shown), such as a remote server or an external memory device via one or more of the communication interfaces 117 and the host processing system 115.

At least a portion of a body of the image display device 103 is transmissive. To illustrate this point, the first drawing depicts a transmissive element 107 in the image display device 103. Specific examples of transmissive elements to form portions of different at least partially transparent types of lighting devices are discussed in more detail below with regard to later drawings. The luminaire 100 also includes an illumination light source emitter array 105 which is comprised of one or more illumination light sources. Although shown separately for ease of illustration in the block diagram, the general illumination device 101, including the illumination light source emitter array 105, may be coupled to or integrated into the body of the image display device 103 and/or coupled to or integrated in/with the light waveguide grid 102. An example of a transmissive illumination light source emitter array 105 is a layer of one or a larger number of OLED type emitters. Other examples include arrays of inorganic LED type emitters.

As noted above, the illumination light source emitter array 105 is a matrix of one or more illumination light source emitters controllable to emit artificial illumination lighting. Illumination light source emitter array 105 generates illumination light for emission through an output surface of the general illumination device 101 (downward in the illustrated example) as light for an illumination application of the luminaire 100. The general illumination device 101, including for example the illumination light source emitter array 105, is configured to output sufficient visible light to support the illumination application of the luminaire 100, for example, to have an intensity and/or other characteristic(s) that satisfy an industry acceptable performance standard for a general lighting application without necessarily requiring concurrent light output from the image display device 103.

The illumination light source emitter array 105 is coupled to or integrated into the body of the luminaire 100, as discussed in more detail later, via the light waveguide grid 102. The illumination light from the illumination light source emitter array 105 is output from the general illumination device 101 into the input interface 102in of the light waveguide grid 102 and then emerges through the output interface 102out of the light waveguide grid 102. For each waveguide of the light waveguide grid 102, the portion of the input interface 102in is optically coupled to a respective illumination light source emitter 105 to steer illumination lighting from the respective illumination light source emitter 105. For each waveguide of the light waveguide grid 102, the portion of the output interface 102out opposes the input interface 102in and is optically coupled to a corresponding portion of the image display device 103.

After passing through the light waveguide grid 102, the illumination lighting enters the input surface 103in of the image display device 103 and then emerges from the output surface 103out of the image display device 103 along with image lighting generated by the image display device 103. Hence, via the light waveguide grid 102, the general illumination device 101 is coupled to supply illumination light to the input surface 103in of the body (transmissive element 107 in the example) of the image display device 103 for transmission along with visible light of an image via the same output surface 103out.

Image display device 103 is an emissive type display device controllable to emit light of a selected image, e.g., as a still image or a video frame. The image display device 103 includes a pixel matrix including an array of pixel light emitters and is also transmissive with respect to light from the illumination light source emitter array 105 of the general illumination device 101. Each pixel light emitter of image display device 103 is controllable to emit light for a respective pixel of the displayed image. The illumination light source emitter array 105 is coupled via the light waveguide grid 102 to the image display device 103 to supply illumination lighting to at least the transmissive element 107. The image and illumination light can be emitted by the transmissive element 107 in tandem (e.g., simultaneously) or in various patterns, for example, based on drive signals sent from the driver system 113.

Each of the pixel light emitters of the image display device 103 and each of the illumination light source emitters of the illumination light source emitter array 105 can be individually driven and controlled. To provide individual control of the illumination light source emitter array 105 and the image display device 103 and, the light waveguide grid 102 can comprise individual waveguide elements that serve as optical barriers, for example, between neighboring illumination light source emitters. Each waveguide element of the light waveguide grid 102 can be structured to provide a one-to-one correspondence between a respective illumination light source emitter and a respective pixel light emitter. For example, a waveguide element couples a single illumination light source emitter to a single pixel light emitter and provides an optical barrier between illumination light source emitters to allow illumination light drive signal patterns for an individual illumination light source emitter to be observed by a viewer. Hence, multiple waveguide elements can prevent mixing of illumination lighting from adjacent illumination light source emitters. Use of multiple waveguide elements in the light waveguide grid 102 can allow the luminaire 100 to output a checkerboard pattern, for example, where alternating illumination light source emitters of the luminaire 100 are driven to provide illumination lighting.

It should be understood that multiple waveguide elements of the light waveguide grid 102 can couple more than one illumination light source emitter to more than one pixel light emitter. For example, one illumination light source emitter can be coupled to two pixel light emitters, two illumination light source emitters can be coupled to one pixel light emitter, two illumination light source emitters can be coupled to two pixel light emitters, two illumination light source emitters can be coupled to three pixel light emitters, etc. Although some level of individual control granularity of the illumination light source emitters may be lost in this arrangement, such an arrangement can be used to drive groups of illumination light source emitters while providing simultaneous image display lighting and illumination lighting in different areas of the luminaire 100. In this example, the areas of the luminaire 100 where the groups of illumination light source emitters are not driven to provide illumination lighting can be driven to display an image with minimal fuzziness or blurriness.

In the example, the transmissive element 107 forms the body of image display device 103. The transmissive element 107 includes transparent optical gaps or apertures between the pixel light emitters of the pixel matrix and is optically coupled to the output interface 102in of the light waveguide grid 102. For example, each gap is an optically transparent (relatively highly transmissive) region located between two or more of the pixel light emitters of the pixel matrix to receive and allow passage of illumination lighting emitted by one or more of the illumination light source emitters or array 105 through the optical coupling. The transmissive element 107 or body of the image display device 103 has an illumination light input surface 103in and an opposing surface 103out opposite the input surface 103in.

The light waveguide grid 102 includes an array of waveguides, each coupling a respective illumination light source emitter of the general illumination device 101 with one or more respective gaps between the pixel light emitters of the image display device 103. Each element of waveguide grid 102 has a hollow housing that includes a portion of the input interface 102in optically coupled to the respective illumination light source emitter to steer illumination lighting from the illumination light source emitter 105. Each element of waveguide grid 102 includes a portion of the output interface 102out opposing the input interface 102in and optically coupled to the gap(s) between the pixel light emitters of image display device 103. Each element of waveguide grid 102 includes at least one reflective wall having an internal reflective surface encompassing and extending from the portion of the input interface 102in and the portion of the output interface 102out. It should be understood that each element of waveguide grid 102 can be a light box or an integrating cavity. For example, at least one reflective wall of each element of waveguide grid 102 can have specular reflective properties to form a light box as in FIG. 4 or diffusely reflective properties to form an integrating cavity as in FIG. 5.

Light waveguide grid 102 is coupled to supply light of the general illumination device 101 for transmission through the body of the image display device 103 to the opposing surface 103out of the body of the image display device 103 (transmissive element 107). The illumination lighting is output along with a visible image via the same output surface 103out on the image display device 103. The input interface 102in of light waveguide grid 102 serves as the input surface for light from the illumination light source emitter array 105. In the example, the opposite surface 102out of light waveguide grid 102 is coupled to or also serves as the input surface 103in of the transmissive element/body 107 of the image display device 103, at least for illumination light from the general illumination device 101.

The drawing (FIG. 1) also shows the inclusion of the luminaire 100 in a system 109, together with a suitable controller 111. As shown in FIG. 1, the controller 111 includes a driver system 113 coupled to the luminaire 100 and a host processing system 115. The controller 111 may also include one or more communication interfaces 117 and/or one or more sensors 126.

The controllable luminaire 100 produces general illumination lighting as well as visible light of an image display output in response to control signals received from the driver system 113. For that purpose, the example of the driver system 113 includes an illumination light source driver 113i configured and coupled to supply suitable power to drive the particular implementation of the illumination light source emitter array 105, and the example of the driver system 113 includes display driver 113d configured and coupled to supply image display signals to the particular implementation of the image display device 103. Although shown separately, the drivers 113i, 113d of the system 113 may be formed by unified driver circuitry.

The image display device 103 may be either a commercial-off-the-shelf image display or an enhanced display or the like specifically adapted for use in the luminaire 100. The image display device 103 is configured to present an image. The presented image may be a real scene, a computer generated scene, a single color, a collage of colors, a video stream, animation, a Trompe-l'oeil design intended to create an illusion of a three-dimensional object, or the like. The general illumination device 101 may be an otherwise standard general illumination system, if suitably transmissive, which is co-located with and optically coupled to an output of the image display device 103. Several examples of the luminaire in which the lighting device and/or the display are specifically configured for use together in a luminaire like 100 are discussed later with reference to FIGS. 2-7.

FIG. 1 also provides an example of an implementation of the high layer logic and communications elements to control luminaire operations to provide selected illumination light, e.g., for a general illumination application, and to provide a selected display image output. As shown, the controller 111 includes a host processing system 115, one or more sensors 126 and one or more communication interface(s) 117. Other implementations of the circuitry of the controller 111 may be utilized. For the purpose of illumination and display operation, the circuitry of the controller 111, in the example, is coupled to the illumination light source emitter array 105 and the light emissive display 103 to drive and control operation of the illumination light source emitter array 105 and the light emissive display 103. The circuitry of the controller 111 may be configured to operate the illumination light source emitter array 105 to generate the illumination light at least during an illumination state of the luminaire 100, and to operate the image display device 103 to emit the light of the image at least during an image display state of the luminaire 100.

The controller 111 may implement a number of different illumination/image display state configurations. For example, the circuitry of the controller 111 is configured to implement the illumination state of the luminaire 100 and the image display state of the luminaire 100 at the same time (i.e., simultaneously). For example, illumination light source emitter array 105 generates illumination light concurrently with emission of the light of the image by the image display device 103. Or the combined illumination and image light output, for example, could provide an even higher overall intensity or coloring tuning for a specific lighting application. The color tuning mixes the colors of the image display device 103 and the illumination light source emitter array 105 so that a user can easily change color temperature of the illumination light. Alternatively, the circuitry of the controller 111 can also drive the illumination state and the image display state at different times, for example, as distinct, mutually exclusive states.

The host processing system 115 provides the high level logic or "brain" of the controller 111 and thus of the system 109. In the example, the host processing system 115 includes memories/storage 125, such as a random access memory and/or a read-only memory, as well as programs 127 stored in one or more of the memories/storage 125. The programming 127, in one example, configures the system 109 to implement two or more of various display and illumination states of the controlled luminaire 100, as outlined above. As an alternative to distinct states, the programming 127 may configure the system 109 to implement a step-wise or substantially continuous adjustment of the relative intensities of the illumination light and image display light outputs of the controlled luminaire 100, encompassing settings to achieve the relative intensity levels of the states discussed above.

The memories/storage 125 may also store various data, including luminaire configuration information 128 or one or more configuration files containing such information, in addition to the illustrated programming 127. The host processing system 115 also includes a central processing unit (CPU), shown by way of example as a microprocessor (µP) 123, although other processor hardware may serve as the CPU.

The ports and/or interfaces 129 couple the processor 123 to various elements of the lighting system 109 logically outside the host processing system 115, such as the driver system 113, the communication interface(s) 117 and the sensor(s) 126. For example, the processor 123 by accessing programming 127 in the memory 125 controls operation of the driver system 113 and thus operations of the luminaire 100 via one or more of the ports and/or interfaces 129. In a similar fashion, one or more of the ports and/or interfaces 129 enable the processor 123 of the host processing system 115 to use and communicate externally via the communication interface(s) 117; and the one or more of the ports 129 enable the processor 123 of the host processing system 115 to receive data regarding any condition detected by a sensor 126, for further processing.

In the operational examples, based on its programming 127, the processor 123 processes data retrieved from the memory 123 and/or other data storage, and responds to light output parameters in the retrieved data to control the light generation by the general illumination device 101, particularly the illumination light source emitter array 105. The light output control also may be responsive to sensor data from a sensor 126. The light output parameters may include light intensity and light color characteristics of light from source. The light output parameters may also control modulation of the light output, e.g., to carry information on the illumination light output of the luminaire 100. The configuration file(s) 128 may also provide the image data, which the host processing system 115 uses to control the display driver 113$d$ and thus the light emission from the image display device 103.

As noted, the host processing system 115 is coupled to the communication interface(s) 117. In the example, the communication interface(s) 117 offer a user interface function or communication with hardware elements providing a user interface for the system 109. The communication interface(s) 117 may communicate with other control elements, for example, a host computer of a building control and automation system (BCAS). The communication interface(s) 117 may also support device communication with a variety of other equipment of other parties having access to the lighting system 109 in an overall/networked lighting system encompassing a number of systems 109, e.g., for access to each system 109 by equipment of a manufacturer for maintenance or access to an on-line server for downloading of programming instruction or configuration data for setting aspects of luminaire operation.

As outlined earlier, the host processing system 115 also is coupled to the driver system 113. The driver system 113 is coupled to the general illumination device 101, particularly the illumination light source emitter array 105, and the image display device 103. Although the driver system 113 may be a single integral unit or implemented in a variety of different configurations having any number of internal driver units, the example of system 113 includes separate general illumination source driver circuit 113$i$ and image display driver circuit 1113$d$. The separate drivers may be circuits configured to provide signals appropriate to the respective type of illumination light source emitter array 105 and/or display 103 utilized in the particular implementation of the luminaire 100, albeit in response to commands or control signals or the like from the host processing system 115.

The host processing system 115 and the driver system 113 provide a number of control functions for controlling operation of the lighting device 111, including in the illumination and image display states discussed earlier. In a typical example, execution of the programming 127 by the host processing system 115 and associated control via the driver system 113 configures the luminaire 100 to perform functions, including functions to operate the illumination light source emitter array 105 to provide light output from the lighting system 112 and to operate the image display device 103 to output a selected image, e.g., based on the lighting device configuration information 128.

In an example of the operation of the lighting device 111, the processor 123 receives a configuration file 128 via one or more of communication interfaces 117. The processor 123 may store, or cache, the received configuration file 128 in storage/memories 125. The file may include image data, or the processor 123 may receive separate image data via one or more of communication interfaces 117. The image data may be stored, along with the received configuration file 128, in storage/memories 125. Alternatively, image data (e.g., video) may be received as streaming data and used to drive the display 103 in real-time.

The display driver 113$d$ may deliver the image data directly to the image display device 103 for presentation or may have to convert the image data into a signal or data format suitable for delivery to the image display device 103. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like. For example, if floating point precision is needed, options are available, such as OpenEXR, to store 32-bit linear values. In addition, the hypertext transfer protocol (HTTP), which supports compression as a protocol level feature, may also be used. For at least some versions of the image display device 103 offering a low resolution image output, higher resolution source image data may be down-converted to a lower resolution format, either by the host processing system 115 or by processing in the circuitry of the driver 113d.

For illumination control, the configuration information in the configuration file 128 may specify operational parameters of the controllable general illumination device 101, such as light intensity, light color characteristic, and the like for light from the illumination light source emitter array 105. The processor 123 by accessing programming 127 and using software configuration information 128, from the storage/memories 125, controls operation of the driver system 113, and through that driver 113i controls the illumination light source emitter array 105, e.g., to achieve a predetermined illumination light output intensity and/or color characteristic for a general illumination application of the luminaire 100, including settings for the illumination light source emitter array 105 appropriate to the current one of the luminaire states discussed earlier.

A software configurable lighting system such as 109 may be reconfigured, e.g., to change the image display output and/or to change one or more parameters of the illumination light output, by changing the corresponding aspect(s) of the configuration data file 128, by replacing the configuration data file 128, or by selecting a different file from among a number of such files already stored in the data storage/memories 125.

In other examples, the lighting system 109 may be programmed to transmit information on the light output from the luminaire 100. Examples of information that the system 109 may transmit in this way include a code, e.g., to identify the luminaire 100 and/or the lighting system 109 or to identify the luminaire location. Alternatively or in addition, the light output from the luminaire 100 may carry downstream transmission of communication signaling and/or user data. The information or data transmission may involve adjusting or modulating parameters (e.g., intensity, color characteristic or the like) of the illumination light output of the general illumination device 101 or an aspect of the light output from the image display device 103. Transmission from the image display device 103 may involve modulation of the backlighting of the particular type of display. Another approach to light based data transmission from the display 103 may involve inclusion of a code representing data in a portion of a displayed image, e.g., by modulating individual emitter outputs. The modulation or image coding typically would not be readily apparent to a person in the illuminated area observing the luminaire operations but would be detectable by an appropriate receiver. The information transmitted and the modulation or image coding technique may be defined/controlled by configuration data or the like in the memories/storage 125. Alternatively, user data may be received via one of the communication interface(s) 117 and processed in the controller 111 to transmit such received user data via light output from the luminaire 100.

Although specially configured circuitry may be used in place of microprocessor 123 and/or the entire host processing system 115, the drawing depicts an example of the controller 111 in which functions relating to the controlled operation of the system 109, including operation of the luminaire 100, may be implemented by the programming 127 and/or configuration data 128 stored in a memory device 125 for execution by the microprocessor 123. The programming 127 and/or data 128 configure the processor 123 to control system operations so as to implement functions of the system 109 described herein. Aspects of the software configurable system example therefore include "products" or "articles of manufacture" typically in the form of software or firmware that include executable code of programming 127 and/or associated configuration data 128 that is/are carried on or embodied in a type of machine readable medium. "Storage" type media include any or all of storage devices that may be used to implement the memory 125, any tangible memory of computers or the like that may communicate with the system 109 or associated modules of such other equipment. Examples of storage media include but are not limited to various semiconductor memories, tape drives, disk drives and the like, which may provide non-transitory storage at any time for the software or firmware programming 127 and/or the configuration data 128. All or portions of the programming and/or data may at times be communicated through the Internet or various other telecommunication networks. Such communications, for example, may enable loading of the programming and/or data from a computer or the like into the host processing system 115 of the controller 111, for example, from a management server or host computer of the lighting system service provider into a lighting system 109. Thus, another type of media that may bear the programming 127 and/or the data 128 includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

Apparatuses implementing functions like those of configurable lighting system 109 may take various forms. In some examples, some components attributed to the lighting system 109 may be separated from the device 101 and image display 103 of the luminaire 100. For example, a lighting system 109 may have all of the above hardware components on or within a single hardware platform as shown in FIG. 1 or in different somewhat separate units. In a particular example, one set of the hardware components may be separated from one or more instances of the controllable luminaire 100, e.g., such that one host processing system 115 may run several luminaires 100 each at a somewhat separate location wherein one or more of the luminaires 100 are at a location remote from the one host processing system 115. In such an example, a driver system 113 may be located near or included in a combined platform with each luminaire 100. For example, one set of intelligent components, such as the microprocessor 123, may control/drive some number of driver systems 113 and associated controllable luminaires 100. Alternatively, there may be one overall driver system 113 located at or near the host processing system 115 for driving some number of luminaires 100. It also is envisioned that some lighting devices may not include or be coupled to all of the illustrated elements, such as the sensor(s) 126 and the communication interface(s) 117. For convenience, further discussion of the system 109 of FIG. 1 will assume an intelligent implementation of the system 109 that includes at least the illustrated components.

In addition, the luminaire 100 of each lighting device 111 is not size restricted. For example, each luminaire 100 may be of a standard size, e. g. 2-feet by 2-feet (2×2), 2-feet by 4-feet (2×4), or the like, and arranged like tiles for larger area coverage. Alternatively, one luminaire 100 may be a larger area device that covers a wall, a part of a wall, part of a ceiling, an entire ceiling, or some combination of portions or all of a ceiling and wall.

Lighting equipment like that disclosed the examples of FIG. 1, may be used with various implementations of the luminaire 100. Although several examples of the luminaire implementations have been briefly discussed above, it may be helpful to consider some examples in more detail.

Figure 2:
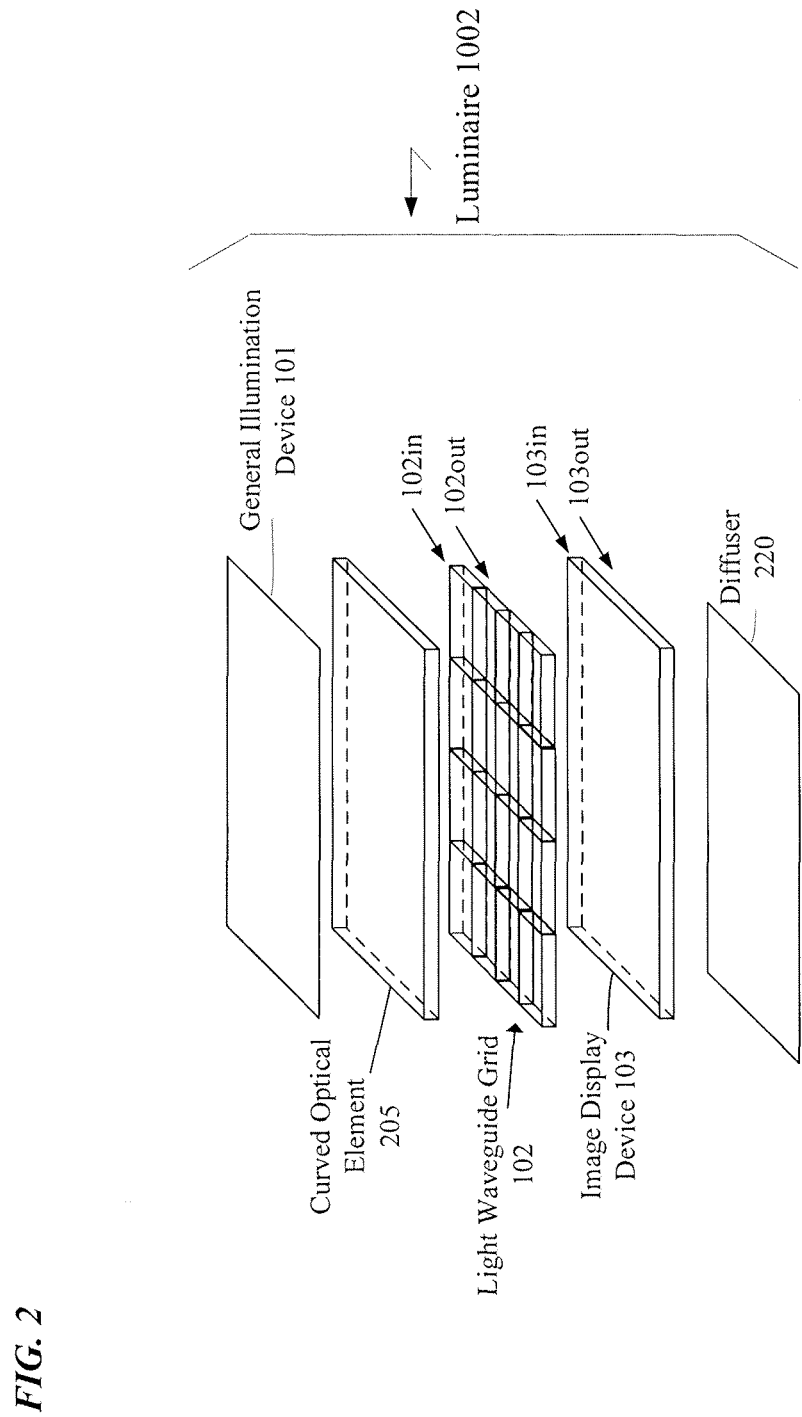
FIG. 2 is an illustration of a stack of components of the luminaire from a side view.

FIG. 2 is an illustration of a stack of components of the luminaire 1002 from a side view. In the example, the combined luminaire 1002 includes a general illumination device 101, curved optical element 205, light waveguide grid 102, image display device 103, and optional diffuser 220.

As noted above, general illumination device 101 emits light for general illumination within a space, and may comprise an array of LEDs configured to emit light. This combined stack of components operates and is controlled essentially as described by way of example above, to produce a distributed light output suitable for general illumination.

In the example of FIG. 2, the controllable lighting system 111 also optionally includes curved optical element 205 that can be formed of plastic, glue, etc. In an example, the curved optical element 205 is positioned over the illumination light source emitter and optically coupled to the input interface 102in of the waveguide and the illumination light source emitter to steer the illumination lighting from the illumination light source emitter through the waveguide. The curved optical element 205 can also be a transparent convex dome surface of the input interface 102in that is integral with the waveguide housing, curves inwards towards the output interface 102out, and is positioned adjacent to the illumination light source emitter. The curved optical element 205 can be a refractive lens that focuses the illumination lighting from the illumination light source emitter.

Alternatively, the curved optical element 205 is formed of a collection of total internal reflection (TIR) lenses that includes a refractive lens inside a reflector that collimates the illumination lighting from the illumination light source emitter, and the TIR lens is integral with the illumination light source emitter and surrounds the illumination light source emitter. Such collimating optics enable light emitted by general illumination device 101 to be coupled more efficiently to transparent regions of image display device 103.

Although not shown, a controllable spatial light modulator can also be used to enable light emitted by general illumination device 101, and optionally collimated by collimating optics to be shaped and/or steered for general illumination within a space. For example, the spatial light modulator may receive control signals from the driver system 113 that control beam steering/beam shaping to process light with a particular beam steering and/or beam shaping process to provide a desired spatial distribution of general illumination.

The luminaire 1002 optionally includes a diffuser 220 placed so as to cover image display device 103 and partially diffuse light generated by both the general illumination device 101 and the image display device 103. If the diffuser 220 is not provided, the light source emitter array 105 of the general illumination device 101 and the light waveguide grid 102 may be visible through the light transmissive body of the image display device 103.

The diffuser controls light distribution, for example, the diffuser 220 helps to homogenize output light for both general illumination device 101 and image display device 103. As shown in the drawing example, the diffuser 220 may be a separate sheet or layer, e.g., of a suitable white translucent material, adjacent to or formed on the output surface 103out of the image display device 103. The diffuser 220, however, may be formed in other ways, for example, e.g., as frit produced by etching or the like, prismatic features, lens structures formed in or coupled to the output surface 103out or input surface 103in of the image display device 103, etc. or across the output surface 102out of the light waveguide grid 102.

The diffuser 220 diffuses the illumination light output received through input surface 103in through the output surface 103out of the image display device 103, which improves uniformity of illumination light output intensity, as may be observed across the output through the output surface 103out and/or as the illumination light distributed at a working distance from the luminaire 1002 (e.g., across a floor or desktop).

For display, the diffuser 220 diffuses the image light from image display device 103. For some types/resolutions of the image display device 103, some degree of diffusion may be tolerable or even helpful. Use of higher resolution data to drive such an implementation of the image display device 103 may cause the image output to become pixelated. In some cases, the pixelation may prevent a person from perceiving the intended image on the image display device 103. Processing of the image data before application thereof to drive the pixel light emitters of the image display device 103 and/or blurring of the output image by the diffuser 220 effectively blurs discrete rectangles or dots of the pixelated image. Such blurring of the pixelated artifacts in the output image may increase an observer's ability to perceive or recognize the output image. An implementation of such a fuzzy pixels approach in a system 109 with luminaire 1002 may be implemented by a combination of downsampling of the image data and use of the diffuser 220 over the image display output via the surface 103out. Additional processing of the image data in the digital domain, e.g., Fourier transformation and manipulation in the frequency domain, may be implemented to reduce impact of low resolution image output on some types of display devices.

In yet another approach that can be combined with or without the separate diffuser 220, the light waveguide grid 102 includes various light extraction optical elements at the output interface 102out that have a pattern of diffuse extraction features. Such light extraction optical elements are outlined in further detail during the discussion of FIG. 4 below.

It should be understood that additional components may be added or removed from the luminaire 1002 depending on the implementation. Although the side view of the luminaire 1002 shows a rectangular luminaire shape, the luminaire 1002 and appropriate components thereof may have other shapes, e.g., circular, oval, square, hexagonal, etc., or a combination thereof.

In the examples of FIGS. 1-2, the image light and/or general illumination light from the image display device 103 provides is visible to a person within the space in which the luminaire 1002 is installed. The intensity and/or color characteristics of the image and/or general illumination light output of the image display device 103 may be selectively controlled; however, there is no direct spatial modulation of image light. Light, however, is additive. The light output of controllable lighting system 109 is selectively modulated. Hence, in an example like that shown in FIGS. 1-2, the combination of light from the general illumination device 101 and the image display device 103 is controlled to emulate a lighting distribution of a selected one of a variety of different luminaires.

In the examples we have been considering so far, a processor, such as 123 configures the luminaire 1002 to provide light output from the image display device 103 and to operate the general illumination device 101 to provide general illumination that substantially emulates a lighting distribution of a selected one of a number of types of luminaires, based on the lighting device configuration information.

As described herein, a controllable lighting system 109 includes a software configurable lighting device, such as luminaire 1002 (e.g., FIG. 1,) of the type described herein. A controller 111 can store configuration information for one or more luminaire output distributions. A user may define the parameters of a distribution in the controllable lighting system 109, for example, via a user interface on a controller 111 or user terminal (e.g., mobile device or computer) in communication with the luminaire 1002. In another example, the user may select or design a distribution via interaction with a server, e.g., of a virtual luminaire store; and the server communicates with the luminaire 1002 to download the configuration information for the selected/designed distribution into the luminaire 1002. When the controllable lighting system 109 stores configuration information for a number of lighting distributions, the user operates an appropriate interface to select amongst the distributions available in the luminaire 100. Selections can be done individually by the user from time to time or in an automatic manner selected/controlled by the user, e.g., on a user's desired schedule or in response to user selected conditions such as amount of ambient light and/or number of occupants in an illuminated space.

Figure 3:
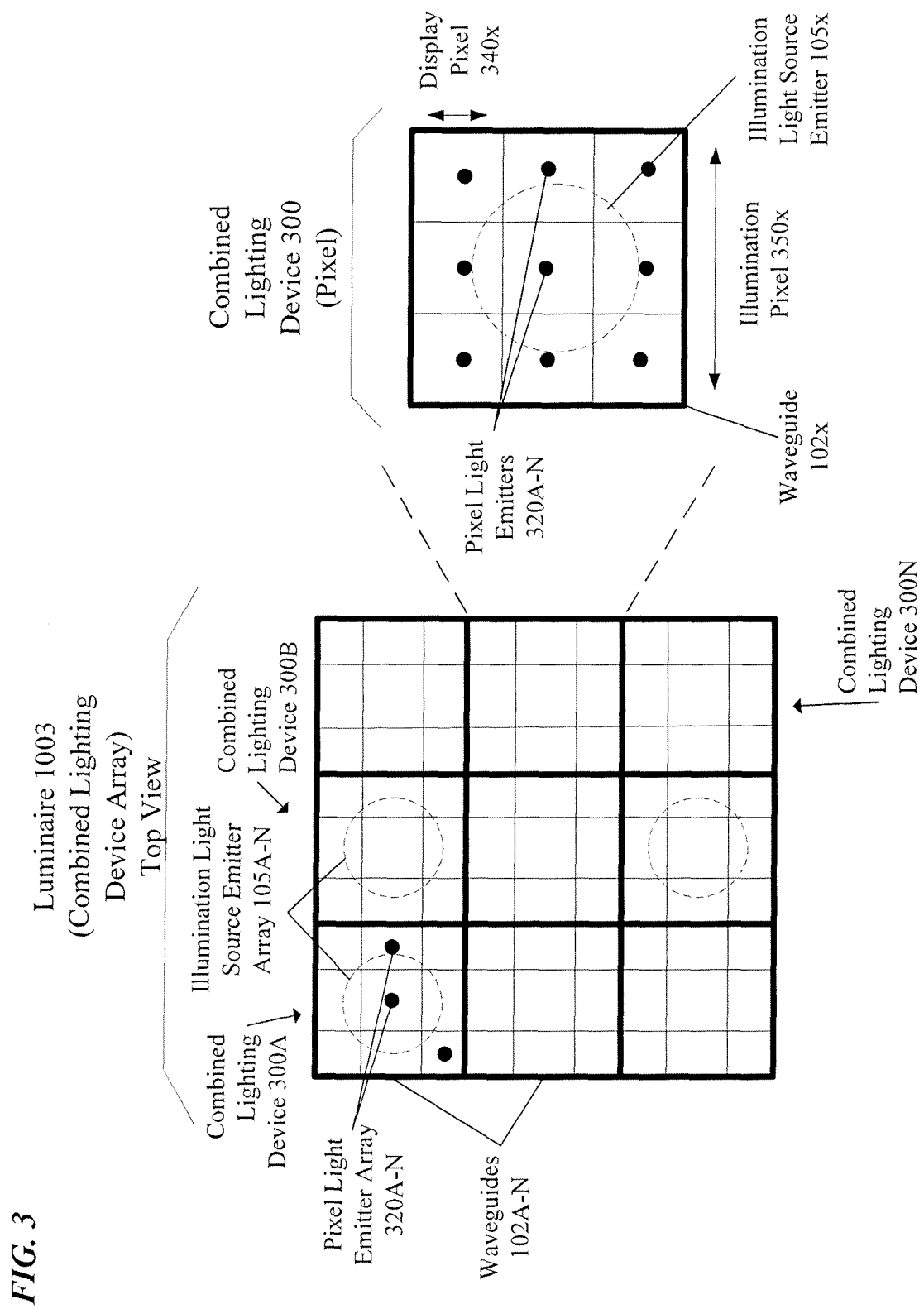
FIG. 3 is a top view of the luminaire depicting a relationship between a general illumination device, the light waveguide grid, and the image display device; and a relationship between an illumination light source emitter of the general illumination device, the light waveguide grid, and pixel light emitters of the image display device.

FIG. 3 is a top view of the luminaire 1003 depicting a relationship between a general illumination device 101, the light waveguide grid 102, and the image display device 103. Also depicted is the relationship between an illumination light source emitter 105x of the general illumination device 101, the light waveguide grid 102, and pixel light emitter 320A-N of the image display device 103.

The light waveguide grid 102 includes waveguides 102A-N that are arranged as an array. As discussed above, image display device 103 includes a matrix of pixel light emitters 320A-N, such as display LEDs, arranged on a support structure framework (e.g., a transparent substrate), that are coupled to a respective waveguide 102x of the light waveguide grid 102. General illumination device 101 includes illumination light source emitters 305A-N, such as illumination lighting LEDs, arranged in an array that are coupled to a respective waveguide 102x of the light waveguide grid 102. In the example, each respective combined light device 300 includes a respective waveguide 102x of the waveguide grid 102. Each waveguide 102x coupled to a single illumination pixel 350x and nine display pixels 340x.

Each illumination light source emitter 105x typically generates light covering an area, herein referred to as an illumination pixel 350x, that encompasses multiple areas, herein referred to as display pixels 340x, corresponding to some number of pixel light emitters 320A-N. For example, each illumination light source emitter 105x (depicted in FIG. 3 by a large dashed circle) and corresponding illumination pixel 350x encompasses nine pixel light emitters 320A-N (depicted in FIG. 3 by a smaller dark filled circle) and corresponding display pixels 340x. Although FIG. 3 depicts a pixel of the combined lighting device 300 as a single illumination pixel 350x encompassing nine display pixels 340x, this is only for simplicity and each illumination pixel 350x and may encompass fewer or more display pixels 340x. Moreover, each waveguide 102x of the waveguide grid 102 may encompass fewer or more illumination pixels 350x and display pixels 340x depending on the implementation.

Of particular note, the waveguide grid 102 is designed to minimize repeated light reflections, with attendant losses, in order to improve the overall efficiency of the luminaire 1003. For example, pixel light emitters 320A-N formed in the image display device 103 are typically not reflective, with respect to illumination light from the opposing illumination light source emitter array 105A-N, which leads to some loss of illumination light. The light reflected from the reflective surfaces in gaps formed between the pixel light emitter array 320A-N of the image display device 103 also reflect back illumination light. Each of these reflections incurs some loss of illumination light. These optical losses reduce the overall efficiency of the luminaire 1003.

Accordingly, as explained herein, the structure of the waveguide grid 102 of the luminaire 1003 is optimized and additional technologies added to reduce such optical losses and improve overall illumination efficiency of the luminaire 1003. Each waveguide 102x is coupled to general illumination device 101 and is comprised of a highly reflective housing that reflects illumination lighting received via input interface 102in from general illumination device 101. Each waveguide 102x further includes a diffuser at the output interface 102out to render the illumination lighting and maximize optical efficiency.

Figure 4:
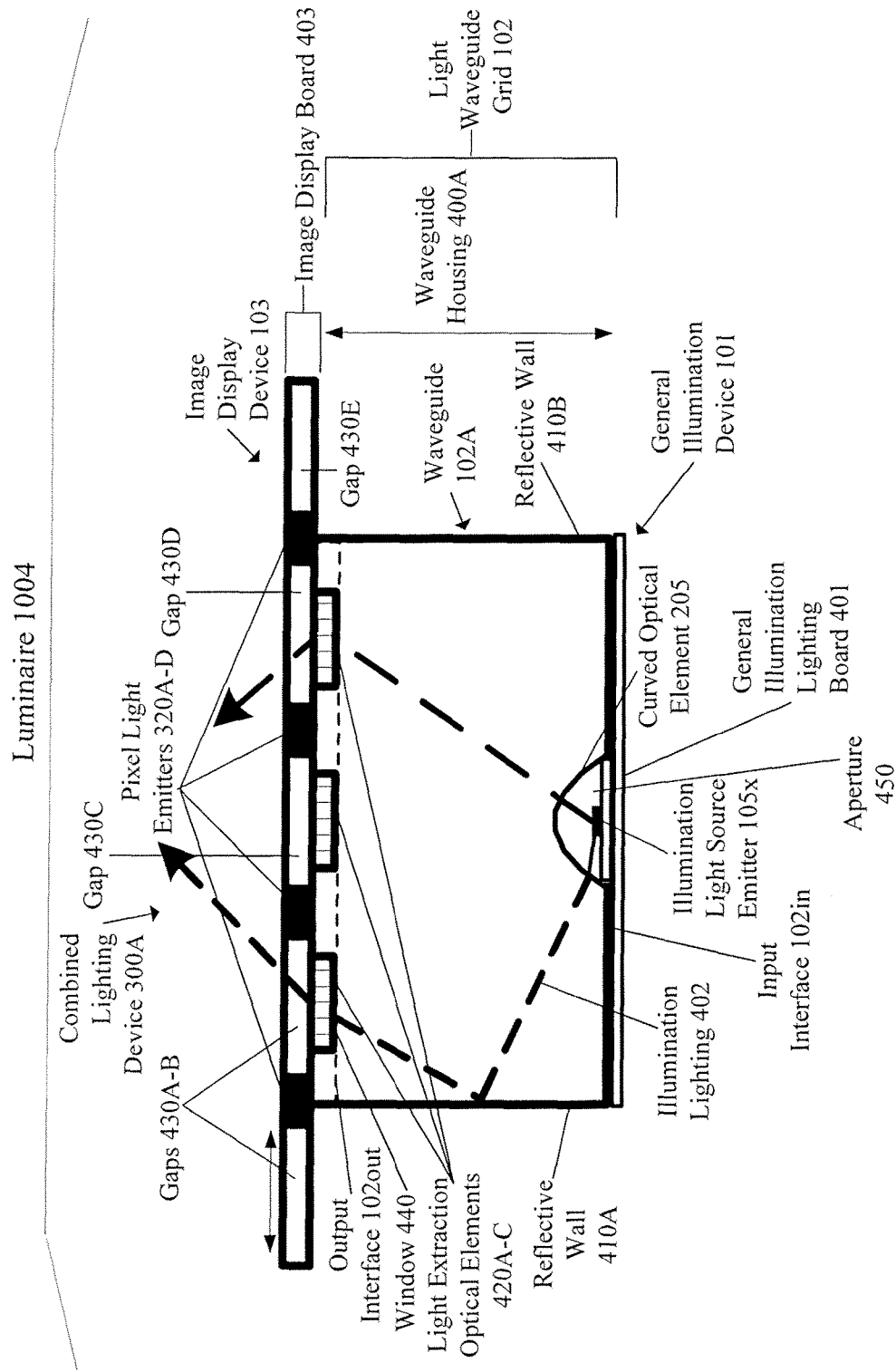
FIG. 4 is a cross-sectional view of a section of a combined lighting device of an example luminaire that combines the general illumination device and the image display device with a respective waveguide of the light waveguide grid.

FIG. 4 is a cross-sectional view of a section of a combined lighting device 300A of an example luminaire 1004 that combines the general illumination device 101 and the image display device 103 with a respective waveguide 102A of the light waveguide grid 102. Although a cross-section of a single combined lighting device 300A is shown, it should be understood that luminaire 1004 typically includes many such combined lighting devices 300A in an array formation. The example illustrates a view of components of the luminaire 1004 with the diffuser 220 absent.

Although illustrated and discussed as separate elements for clarity, it should be understood that the curved optical element 205 and the waveguide 102A may be formed integrally. The waveguide 102A is an optical element that guides the illumination light from the general illumination device 101 through respective gaps 430A-D in the image display board 403. There are multiple ways the waveguide 102A can be implemented, including as shown in FIGS. 4-6.

Figure 5:
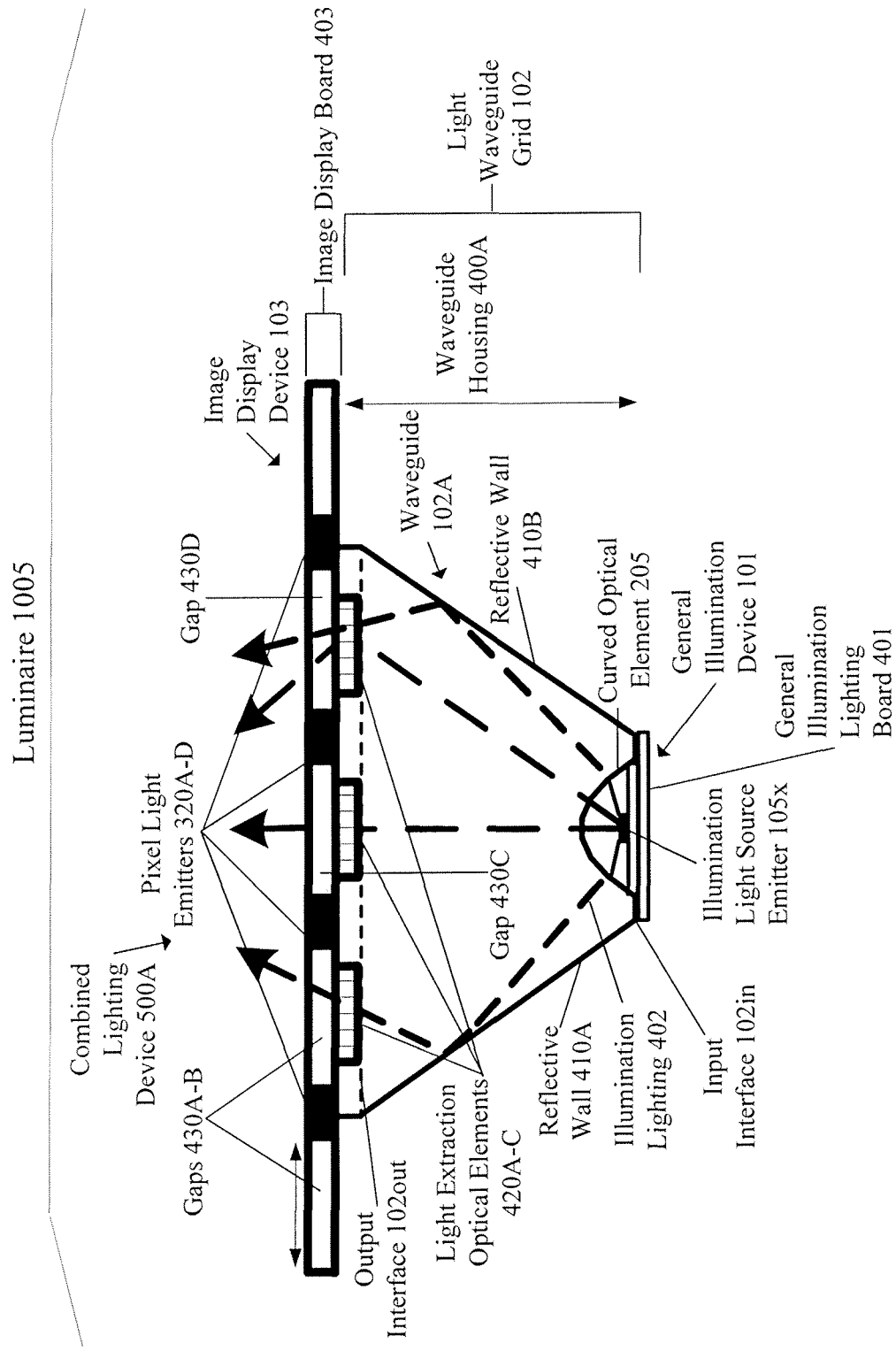
FIG. 5 is a cross-sectional view of a section of a combined lighting device of an example luminaire with a convexly shaped waveguide housing.
Figure 6:
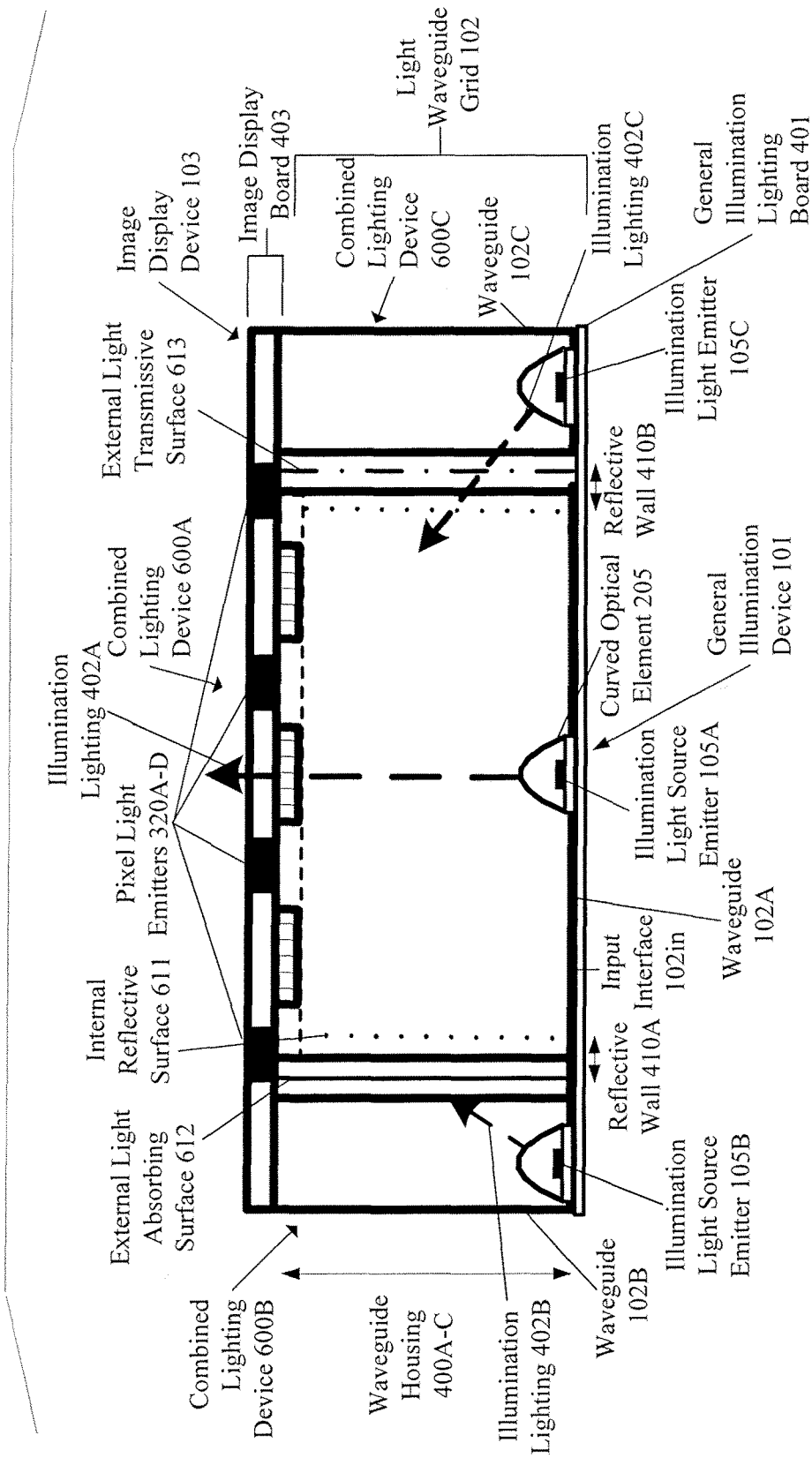
FIG. 6 is a cross-sectional view of a section of three combined lighting devices of an example luminaire in which the waveguide housing includes an external light absorbing surface and an external light transmissive surface.

As discussed in further detail below, the examples of FIGS. 4-6 are drawn in a way assuming that the light waveguide grid 102 is formed of solid material. The waveguide 102A can be a hollow reflector with features on either side of reflective walls 410A-B or near the openings of image display board 403 (e.g., prismatic structures for improving transparency of the display lighting board 403 of the image display device 103).

The general illumination device 101 that is the source of illumination light includes a number of illumination light source emitters 105x that are lighting LEDs. The illumination light source emitters 105x are supported along the periphery of the waveguide housing 400 by one or more circuit boards that form the general illumination lighting board 401. In a rectangular example like that shown, two circuit boards 401 support some number of the illumination light source emitters 105x along opposite lateral sides of the waveguide 102A. In a typical LED based general illumination lighting device 101, the illumination light source emitter 105x may be a white LED. In a tunable LED based lighting device 101, the illumination light source emitter 105x may be combinations of different types of LEDS, such as RGB (red/green/blue) LEDs, RBGW (red/green/blue/white) LEDs, or two or more types of white LEDs of different color temperatures. There may be only one illumination light source emitter 105x as shown, or more illumination LEDs 105x in the combined lighting device 300A. Various types of illumination light source emitters 105x may be used, such as one or more organic light emitting diodes (OLEDs); one or more micro LEDs; one or more nanorod or nanowire LEDs; at least one fluorescent lamp; or at least one halogen lamp. In an example, illumination light source emitters 105x include a number of layers forming one or more actual OLEDs (e.g., a stack including multiple emissive, anode, cathode, and transport layers).

As noted, the luminaire 1004 also includes the image display device 103. Image display device 103 is an emissive type display device that emits light of the image rather than reflecting light to represent the image. The image display device 103 includes a number of pixels. In the example, each pixel has a number pixel light emitters 320A-C for controllable emission of a corresponding number of different colors of light, e.g., RGB or RGBW. Although an OLED display is used in the example image display device 103, a plasma display or other types of emissive displays may be used. The example image display device 103 uses a matrix of RGB LEDs for pixel light emitters 320A-C. In the specific example, pixel light emitters 320A and 320D are mounted or formed at the intersection points of the light waveguide grid structure. Alternatively, gaps 430A and 430D are mounted or formed between the intersection points of the light waveguide grid 102.

LEDs forming pixel light emitters 320A-C are supported by a support structure framework illustrated as an image display board 403, for example, at intersections of rows and columns of the image display board 403. The image display board 403 may form a matrix and is made of a transparent substrate and/or suitable circuit board materials, to support the pixel light emitters 320A-C, provide connections to electrical contacts of the pixel light emitters 320A-C as well also to run any necessary wiring from the drive circuitry 113d to the pixel light emitters 320A-C. The circuit board(s) forming the image display board 403 may also support some or all of the display driver circuity. The image display device 103 is coupled to supply light of the selectable image to at least the transmissive element 107 of the body of the luminaire 1004 for output as a visible image via the combined lighting device 300A.

The light waveguide grid 102 includes a number of light waveguides 102A laid out as an array, including waveguide 102A. As shown, light waveguide 102A couples an illumination light source emitter 105x of the general illumination device 101 with gaps 430B-D between the pixel light emitters 320A-C of the image display device 103. The waveguide 102A includes a housing 400A having an input interface 102in optically coupled to the illumination light source emitter 105x to steer illumination lighting from the illumination light source emitter 105x. Waveguide housing 400A also includes an output interface 102out opposing the input interface 102in and optically coupled to the gaps 430B-D between pixel light emitters 320A-C. The output interface 102out includes a window 440 that is optically coupled to the gaps 430B-D between the pixel light emitters 320A-C. The window 440 may also be coupled to an optional light extraction optical element 420A-C to control the distribution of illumination lighting 402. It should be understood that although a single window 440 is labeled for the sake of simplicity, the output interface 102A typically includes a plurality of windows 440 and each of the windows 440 is optically coupled to a separate light extraction optical element 420A-C and a respective gap 430B-D between respective pixel light emitters 320A-C.

While internal surfaces of the waveguide housing 400A are highly reflective, the window 440 is an opening or made of non-reflective, highly transmissive material, such as glass or plastic. The gaps 430B-D can be highly transmissive, for example, gaps 430B-D can be formed of non-reflective highly transmissive glass or plastic and/or hollow inside. However, the gaps 430B-D may be partially reflective depending on the implementation. For example, gaps 430B-D may include longitudinal reflective walls that are perpendicular to interfaces 102in and 102out to direct illumination lighting 102 out of the image display board 403, while the lateral surfaces that are parallel to interfaces 102in and 102out are highly transmissive.

Light waveguide 102A has a light transmissive waveguide housing 400A, an output interface 102out on the waveguide housing 400A, and an input interface 102in on the waveguide body opposite the output interface 102out. The waveguide housing 400A also includes one or more reflective walls 410A-B that have an internal reflective surface that encompass and extend from the input interface 102in and the output interface 102out. As shown, reflective walls 410A-B can have specular reflective properties to form a light box. The internal reflections of the illumination lighting 402 propagating through the waveguide 102A are governed by Snell's Law.

For the present discussion, the reflective walls 410A-B are made of highly reflective material or include reflective coating layer(s) on the surface, such as on surface portion(s) thereof facing toward the output interface 102out of the waveguide housing 400A. The reflective material is highly reflective, for optimum efficiency; and the reflective material may be highly diffuse (e.g., Lambertian). For example, the reflective material(s) forming the reflective walls 410A-B provide white/diffuse reflectivity.

In an example, the waveguide housing 400A is fabricated from acrylic, plastic, glass, or Tyvek® solid material. The waveguide housing 400A is generally hollow inside and colored white. The reflective walls 400A-B of the waveguide housing 400A can be generally flat (e.g., substantially planar) or have a convex shape. To optimize lighting efficiency, the waveguide housing 400A can be coated with Spectralon® which approximately 99% reflective, but can be expensive. In another example, the waveguide housing 400A is coated with a barium sulfate and white paint mix (similar to Tyvek®), which is approximately 95% reflective, but more cost effective than a Spectralon® coating.

Waveguide housing 400A includes opposing surfaces 102in and 102out (bottom and top surfaces in the drawing) between which the illumination lighting 402 is internally guided. The waveguide 102A may also include a reflective film adhered to the reflective walls 410A-B and the output interface 102out with a glue. The glue has a refractive index matching the solid material (e.g., acrylic or glass) that forms the waveguide housing 400A. The reflective film can also be adhered to the output interface 102out and has openings aligning with the window(s) 440 of the output interface 102out and the gaps 430A-D of the image display board 403. The reflective film can also be adhered to the input interface 102in and has openings aligning with the curved optical element 205, aperture 450, and illumination light source emitter 105x of the general illumination lighting board 401.

The waveguide housing 400A also includes one or more lateral surfaces (input interface 102in and output interface 102out) through which light can be introduced into the waveguide 102A from one or more light sources coupled to the input interface 102in. The reflective walls 410A-B of the waveguide housing 400A guide the illumination lighting 402 introduced at the input interface 102in to optimize the efficient extraction of illumination lighting 402 and minimize leakage of illumination lighting 402 into neighboring waveguides. Typically, illumination lighting 402 introduced at the input interface 102in only emerges from the reflective walls 410A-B at desired specially configured output locations at the output interface 102out, such as via window 440 and light extraction optical elements 420A-C. FIG. 4 shows dotted line/arrow examples of just few of the illumination lighting 402 paths from illumination light source emitter 105x through the waveguide 102A and out via the output interface 102out.

The illumination light source emitter 105x is optically coupled to supply illumination lighting 402 to the waveguide 102A via one or more waveguide input surfaces (input interface 102in) via an aperture 450 formed in the input surfaces of the input interface 102in. The waveguide 102A provides emits illumination lighting 402 via the output interface 102out as light for an illumination application of the luminaire 1004. The aperture 450 can be a rectangular, circular, oval, or hexagonal shaped opening or a combination thereof.

The aperture 450 is typically a notch inside the waveguide 102A which improves light coupling from the illumination light source emitter 105x into the waveguide 102A by capturing illumination lighting 402 which is otherwise not collected by the waveguide 102A. The aperture 450 has a shape has to be designed with other features to optimize the final distribution of the illumination through the luminaire 1004, and other parameters. Once illumination lighting 402 is coupled into the waveguide 102A, illumination lighting 402 may bounce around in the waveguide 102A due to total internal reflection (TIR), which depends on the angles at the reflective walls 410A-B. An optional curved optical element 205 can also be coupled to the optical path of illumination lighting 402 emitted by illumination light source emitter 105x.

The curved optical element 205 is positioned over the illumination light source emitter 105x and optically coupled to the input interface 102in of the waveguide 102A and the illumination light source emitter 105x to steer the illumination lighting 402 from the illumination light source emitter 105x through the waveguide 102A. For example, the curved optical element 205 is a refractive lens that focuses the illumination lighting from the illumination light source emitter 105x. The curved optical element 205 can be a total internal reflection (TIR) lens that includes a refractive lens inside a reflector that collimates the illumination lighting from the illumination light source emitter 105x. The curved optical element 205 can be integral with the illumination light source emitter 105x and surround the illumination light source emitter 105x. Moreover, the curved optical element 205 can be a transparent convex shaped surface and/or transparent dome shaped surface of the input interface 102in that is integral with the waveguide housing 400A. The curved optical element 205 can curve inwards towards the output interface 102out and is positioned adjacent to the illumination light source emitter 105x.

In the illustrated example, waveguide housing 400A is substantially planar. For example, the waveguide housing 400A forms a square or rectangular shape. However, as depicted in FIG. 5, it can be advantageous for the waveguide housing 400A to have a convex lens like shape (e.g., pyramid shape) with convex reflective walls 410A-B because acute angles between the internal reflective walls 410A-B, input interface 102out, and output interface 102out of FIG. 4 tend to trap light. Although shown as a flat (smooth and even) surface at about a 60° degree incline, the reflective walls 410A-B can be curved. As shown in FIG. 5, a waveguide housing 400A with a convex shape has obtuse angles between the internal reflective walls 410A-B, input interface 102out, and output interface 102out and thus improves light efficiency. Returning to the specific example shown in FIG. 4, the input interface 102in and output interface 102out are planar surfaces that are actually parallel to each other, although there may be some minor deviation due to the process of forming those surfaces of the material forming the waveguide housing 400A of the waveguide 102A. However, as noted above, there may also be applications in which either one or both of the input interface 102in and output interface 102out of the waveguide housing 400A of the waveguide 102A has a non-planar contour, such as concave, convex or exhibiting a recurring waveform of illumination lighting 402 (e.g., sinusoidal or sawtooth).

Other light extraction techniques may be used in the waveguide 102A. The example luminaire 1004, with the incorporated display 203, utilizes a combination of light extraction optical elements 420A-C aligned with respective gaps 430B-D between the pixel light emitters 320A-C forming the pixels of the combined lighting device 300A and diffuse reflectivity on portions (other than the pixel light emitters 320A-D) of the image display device 103.

The light extraction optical elements 420A-C in or associated with the waveguide 102A are aligned with the gaps 430B-D, although the light extraction optical elements 420A-C may not fully cover the respective gaps 219. The light extraction optical elements 420A-C diffuse the illumination lighting 402 from within the waveguide 102A out through the output interface 102out and the gaps 430B-D between the pixel light emitters 320A-C. Each light extraction optical element 420A-C is a diffuser formed in or coupled to the output interface 102out of the respective waveguide 102A and is formed of an etched frit glass, scratched glass, sanded glass, prism, lens, or sheet of diffusely transmissive material. The light extraction optical elements 420A-C can break a TIR condition, or simply scatter light, at the output interface 102out and allow light to couple out of waveguide 102A, in this example, for transmission through the gaps 430B-D between pixel light emitters 420A-C.

As noted above, light extraction optical elements 420A-C may take the form of a treatment or structure formed in the waveguide housing 410A at the output interface 102out, in appropriate regions of that output interface 102out (hence, the illustration of the light extraction optical elements 420A-C as being located within the waveguide housing 410A along and abutting the surface 102out). Light extraction optical elements 420A-C could be frit produced by etching or the like, prismatic features, lens structures formed in or coupled to the surface, etc. formed in or located in an appropriate pattern along regions of the output interface 102out of the waveguide 102A.

In one example, light extraction optical elements 420A-C are a holographic type where the diffusion angle can be controlled to be a few degrees, such that the lighting distribution is not significantly affected by it, but at the same time can hide some features of the layers behind it, such as illumination light source emitter 105x, that would otherwise be more visible since the image display device 103 is partially transparent.

The waveguide 102A thus may be described as a "patterned waveguide" with light extraction optical elements 420A-C of the pattern aligned with gaps 430B-D in the pixel matrix of the image display device 103. Other extraction technologies may be mounted on the outside of the waveguide 102A at appropriate locations above output interface 102out. For example, each diffuser of the light extraction elements 420A-C can further include an addressable liquid crystal cell that is optically aligned with the gaps 430B-D. Such a liquid crystal cell can block or diffuse the illumination lighting 402 based on being driven to an on/off state by the illumination light emitter driver 113i or image display driver 113d.

A light ray of illumination lighting 402 from within the waveguide 102A hits one of the light extraction optical elements 420A-C, diffuses, and then passes through one of the gaps 430B-D. Illumination lighting 402 emerging through the gaps 430B-D may reflect off of longitudinal reflective surfaces in gaps 430B-D between illumination light emitters 320A-C. This reflection may also tend to diffuse the illumination lighting 402. The light extraction optical elements 420A-C are distributed so as to promote uniform intensity output of the illumination lighting 402 out of the waveguide 102A.

As discussed above, implementation of the luminaire 1004 in the controllable lighting system 109 of FIG. 1, includes circuitry like 113 coupled to illumination light source emitters 105A-N of the general illumination lighting board 401 and to pixel light emitters 320A-N of the image display board 403 to drive and control operation of the general illumination device 101 and the image display device 103. The circuitry 113 is configured to operate the general illumination device 101 to generate the illumination lighting 402 during an illumination state of the luminaire 1004, and to operate the image display device 103 to emit the light of the image during an image display state of the luminaire 1004.

In a first experiment, the luminaire 1004 achieves approximately 47% total optical efficiency and 330 lumens output when turning 16 light source emitters 105x fully on. In this example, the waveguide housing 400A is formed of white square shaped boxes made of solid Tyvek® material, that are approximately 80% reflective. The Tyvek® material alone is approximately 95% reflective. The light extraction optical elements 420A-C are formed of a Makoron LC7 diffuser that is approximately 82% transmissive and the image display board 403 is approximately 80% transmissive. A Makoron LC3 diffuser 220 that is approximately 90% transmissive is also mounted on the image display device 103. Images with bright regions are displayed on the image lighting device 103 and 16 illumination light source emitters 105x of the general illumination lighting board 401 are turned fully on in the bright regions. Each illumination light source emitter 105x outputs 44 lumens. Factoring in the 46% total optical efficiency of the luminaire 1004, approximately 330 lumens is outputted (44 lumens×16 emitters× 0.47 efficiency).

In a second experiment, the luminaire 1004 achieves between approximately 30% to 60% total optical efficiency when the light waveguide grid 102 is comprised of waveguides 102A-N that are each reflecting light boxes with holes. The illumination light source emitter 105x is a 1 mm square shape area with uniform light intensity over various output angles of illumination lighting 402. The waveguide housing 400A is a cube/square shaped box where the length, width and height are the same. The waveguide housing 400A has 24 mm long sides (reflective walls 410A-B). The input interface 102in is a surface that includes an aperture 450 that is a 2 mm square opening in the backside of waveguide housing 400A. The output interface 102out includes a 3×3 array of square windows 440 for a total of nine windows 440 with an 8 mm spacing between to mimic the spacing between the gaps 430A-D of the image display board 403. The windows 440 have an approximately 51% clear area.

As noted earlier, the total optical efficiency of the luminaire 1004 varies depending on the optical properties of the waveguide housing 400A. In experiment two, a variety of total optical efficiency measurements are taken for the luminaire 1004 using the foregoing setup and while varying the reflective properties of the reflective walls 410A-B. Perfectly absorbing reflective walls 410A-B achieve 5% total optical efficiency. Mirror reflective walls 410A-B (95% reflective) achieve 56% optical efficiency. Flat white reflective walls 410A-B (95% reflective) achieve 57% optical efficiency. White reflective walls 410A-B (98% reflective) achieve 76% optical efficiency. Spectralon® coated white reflective walls 410A-B (99% reflective) achieve 86% optical efficiency. It should be noted that the light distribution of the luminaire 1004 has strong peaks corresponding to the gaps 430A-D of the image display board 403.

In a third experiment, the luminaire 1004 achieves approximately 55% total optical efficiency when the light waveguide grid 102 is comprised of waveguides 102A-N with a waveguide housing 400A that are each reflecting light boxes with holes and formed of solid acrylic material. As in the second experiment, the illumination light source emitter 105x is a 1 mm square shape area with uniform light intensity over various output angles of illumination lighting 402. The waveguide housing 400A is a cube/square shaped box that has 24 mm long sides (reflective walls 410A-B). The output interface 102out includes a 3×3 array of square windows 440 for a total of nine windows 440 with an 8 mm spacing between to mimic the spacing between the gaps 430A-D of the image display board 403. The windows 440 have an approximately 51% clear area. However, the input interface 102in is a surface that includes an aperture 450 that is a 2 mm square opening in the backside of waveguide housing 400A with a coupled curved optical element 205 that is dome shaped. In addition, the waveguide 102A includes a reflective film adhered to the reflective walls 410A-B and the output interface 102out with a glue. The glue has a refractive index matching the solid acrylic material forming the waveguide housing 400A. The reflective film is adhered to the output interface 102out and has openings optically aligned with the window(s) 440 of the output interface 102out and gaps 430A-D of the image display board 403.

Although the light extraction optical elements 420A-C appear as elements with windows that align with where the image display device board 403 has gaps 430B-D, it should be understood that the light extraction optical elements 420A-C can be scattering, curved, or other types of optical elements. The combination of the light extraction optical elements 420A-C with other aspects of the waveguide 102A (e.g., reflective walls 410A-B, curved optical element 205, aperture 450) create the final distribution for illumination lighting 402A, avoid or recycle light that would otherwise be blocked by the pixel light emitters 320A-D of the image display device 103, and also smooth out any artifacts by the time the illumination lighting 402 approaches the final diffuser layer.

FIG. 5 is a cross-sectional view of a section of a combined lighting device 500A of an example luminaire 1005 with a convexly shaped waveguide housing 400A. The waveguide housing 400A includes a plurality of reflective walls 410A-B, and edges of the reflective walls 410A-B encompass the input interface 102in and the output interface 102out. As shown, the reflective walls 410A-B provide the waveguide housing 400A with a non-planar contour, in particular, a convex shape. As shown, reflective walls 410A-B can have diffusely reflective properties to form an integrating cavity. Since efficiency of the luminaire 1005 is non-linear, the reflective walls 410A-B and curved optical element 205 are designed to minimize optical losses and maximize optical efficiency. Accordingly, the reflective walls 410A-B are made of highly reflective materials and coatings; and the structures of the reflective walls 410A-B and curved optical element 205 reduce the number of internal reflections of the illumination lighting 402 within the waveguide housing 410A. In the example, an obtuse angle is formed between the input interface 102out and the reflective walls 410A-B to cause illumination lighting 402 incident on the reflective walls 410A-B and subsequently reflected off the reflective walls 410A-B to be between 30° and 180°. Although the example of FIG. 4 has reflective walls 410A-B which provide the waveguide housing 400A with a generally square or rectangular shape (e.g., box like), the waveguide housing 400A in FIG. 5 is a convex inverted pyramid like shape. The reflective walls 410A-B are triangularly shaped to provide the waveguide housing with the inverted pyramid shape. This convex shape lends itself to high optical efficiency because the edges, such as where the reflective walls 410A-B encompass the input interface 102in and the output interface 102out, do not trap as much light, and also can be modified to adjust the lighting distribution. In other examples, the waveguide housing 400A may have reflective walls 410A-B to provide the waveguide housing 400A with other non-planar contours or shapes, such as circular, elliptical, or to generate a recurring waveform of illumination lighting 402 (e.g., sinusoidal or sawtooth).

FIG. 6 is a cross-sectional view of a section of three combined lighting devices 600A-C of an example luminaire 1006 in which the waveguide housing 400A includes an external light absorbing surface 612 and an external light transmissive surface 613. The entire cross-section of combined lighting device 600A is shown, while only relevant portions of combined lighting devices 600B and 600C are depicted and simplified in the illustration. In this example, the combined lighting device 600A includes a waveguide housing 400A that includes reflective walls 410A-B each of which has an internal reflective surface 611 that encompasses and extends from the input interface 102in and the output interface 102out. The internal reflective surface 611 of each of the reflective walls 410A-B is positioned in the interior of the waveguide housing 400A of the combined lighting device 600A. In an example, the internal reflective surface 611 is flat and colored white and can be highly diffusively reflective. The internal reflective surface 611 can include a mirror.

Reflective wall 410A also includes an external light absorbing surface 612 on the exterior of the waveguide housing 400A that is adjacent to the waveguide housing 400B of combined lighting device 600B. The external light absorbing surface 612 blocks illumination lighting 402B from the adjacent illumination light source emitter 105B of the combined lighting device 600B that is outside the waveguide housing 400A. The external light absorbing surface 612 can also block stray light from other illumination light source emitters mounted on the general illumination lighting board 401. For example, external light absorbing surface 612 blocks incident scattered light 402B from/in the waveguide housing 400B from reaching the interior of the waveguide housing 400A and prevents incident scattered light 402B from mixing with illumination lighting 400A. The external light absorbing surface 612 is coated with black paint and covered with adhered black tar paper or adhered black foam.

Reflective wall 410B also includes an external light transmissive surface 613 on the exterior of the waveguide housing 400A that is adjacent to the waveguide housing 400C of combined lighting device 600C. The external light transmissive surface 613 allows illumination lighting 402C from the adjacent illumination light source emitter 105C to traverse the waveguide housing 400A. For example, external light transmissive surface 613 allows incident light 400C from/in waveguide housing 400C to reach an interior of the waveguide housing 400A and mix with the illumination lighting 402A emitted by illumination light source emitter 105A. The external light transmissive surface 613 can be used to create a mixed illumination light zone between the neighboring combined light devices 600A and 600C and with other illumination light source emitters mounted on the general illumination lighting board 401 to make the illumination lighting 402 more aesthetically pleasing to the eyes of an observer.

Figure 7:
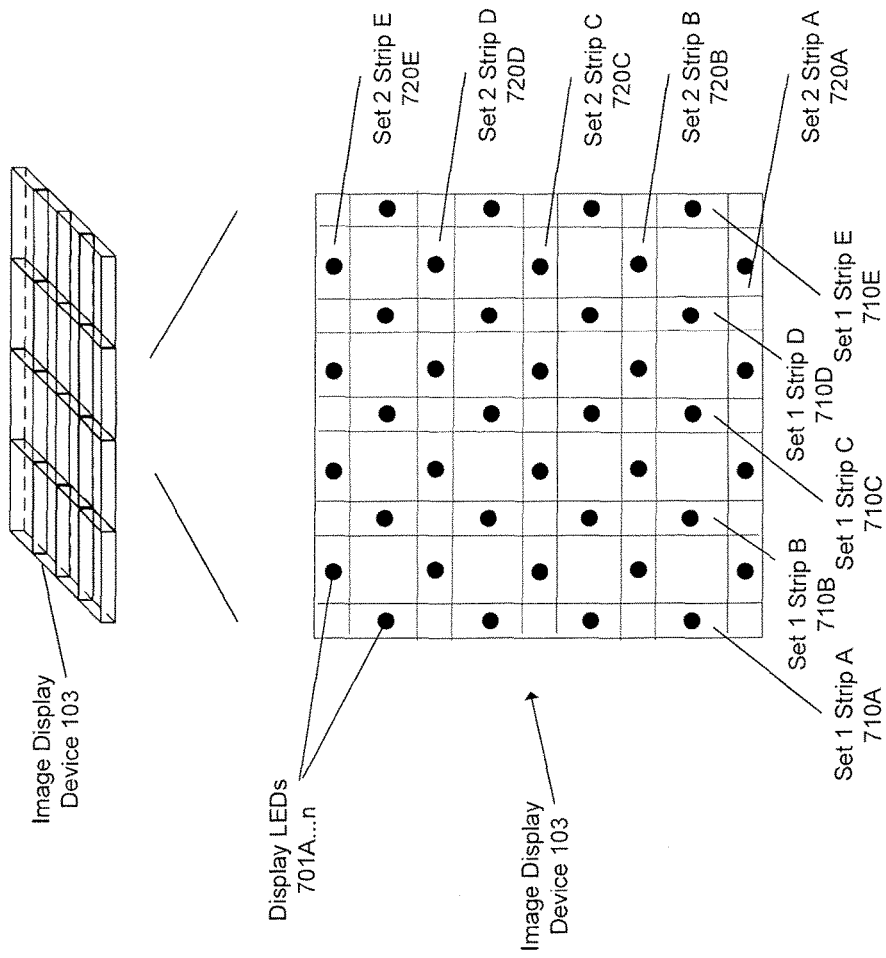
FIG. 7 is an isometric view of an image display device and an enlarged plane view of a portion of the image display device depicting an LED matrix formed by strips of LEDs, such as an image display device being implemented in a software configurable luminaire, like that of FIG. 1.

FIG. 7 depicts an isometric view of the image display device 103 and an enlarged plan view of a portion of image display device 103, formed of LEDs interspersed along two sets of strips with one set of strips placed perpendicular to the other set of strips on a support structure framework. The support structure framework of the image display device 103 can be a transparent substrate, e.g., for OLEDs. Referring to the enlarged plan view of FIG. 7, image display device 103 includes two sets of LED strips. For example, the first set includes set 1 strip A-set 1 strip E 710A-710E and the second set includes set 2 strip A-set 2 strip E 720A-720E. Each strip of the first set is positioned in parallel with and evenly spaced apart from neighboring strips of the first set. For example, set 1 strip B 710B is placed in parallel with and evenly spaced apart from set 1 strip A 710A and set 1 strip C 710C. As a further example, set 1 strip B 710B is placed 14 mm apart from set 1 strip A 710A and 14 mm apart from set 1 strip C 710C. Similarly, each strip of the second set is positioned in parallel with and evenly spaced apart from neighboring strips of the second set. For example, set 2 strip B 720B is placed in parallel with and evenly spaced apart from set 2 strip A 720A and set 2 strip C 720C. As a further example, set 2 strip B 720B is placed 14 mm apart from set 2 strip A 720A and 14 mm apart from set 2 strip C 720C. In addition, the first set of LED strips is placed perpendicular to the second set of LED strips. For example, set 1 strip A 710A is placed perpendicular to set 2 strip A 720A. In this way, the two sets of LED strips form a matrix (e.g., a lattice).

The matrix formed by the two sets of LED strips includes display LEDs 701A . . . n. More specifically, each LED strip includes some number of LEDs 701A . . . n. Each LED in a strip is evenly spaced apart from neighboring LEDs in the same LED strip. For example, each LED in set 1 strip A 710A is placed 2 mm apart from each neighboring LED in the strip. In a further example, when LEDs within a strip are placed 2 mm apart and each strip within a set is placed 14 mm apart from neighboring strips within the set, each LED of one set are located 10 mm apart from neighboring LEDs of the other set at a 45° angle with respect to the perpendicular strips. With this approach, the number of LEDs in any one strip is minimized and the spacing between LEDs is maximized while also maintaining an acceptable level of transparency and an acceptable resolution for image display.

In a further example, each LED is controlled individually and the minimized number of LEDs per strip allows the use of fewer drivers per strip. The minimized number of LEDs, in this further example, also allows the drivers to be placed at the edge of each strip. In this further example, a single 48 channel driver can be used to control 16 RGB LEDs in one strip. The resulting matrix of this further example provides roughly 10 mm resolution along a 45° angle for a display of size ~14 mm*(16+1)=240 mm square, where all the LED drivers are along the edge and do not reduce the transparency of the LED display. In an alternate example, the LEDs are arranged in a rectangular matrix at the intersecting points between the matrix lines, with transparent sections in regions without LEDs or address lines. In this alternate example, alternative approaches to driving the LEDs, such as a passive matrix approach, can also minimize the number of address lines/drivers and improve the transparency of the LED display.

As noted above, the image display device 103 could be a transparent OLED display, further examples of which are disclosed in U.S. patent application Ser. No. 15/095,192, filed Apr. 11, 2016, entitled, LUMINAIRE UTILIZING A TRANSPARENT ORGANIC LIGHT EMITTING DEVICE DISPLAY, the disclosure of which is entirely incorporated by reference. Another transparent display approach might use a matrix of LEDs with a support structure having transparent gaps between the LEDS and between the support rows and columns of the matrix of the support structure, as disclosed for example in U.S. patent application Ser. No. 15/198,712, filed Jun. 30, 2016, entitled ENHANCEMENTS OF A TRANSPARENT DISPLAY TO FORM A SOFTWARE CONFIGURABLE LUMINAIRE, the disclosure of which is entirely incorporated by reference.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:
1. A luminaire comprising:
a general illumination device for illumination of a space, including:
an array of illumination light source emitters controllable to emit illumination lighting for the space;
an image display device configured to display an image, including:
a pixel matrix including an array of pixel light emitters, each pixel light emitter being controllable to emit light for a respective pixel of the displayed image;
gaps between pixel light emitters of the pixel matrix;
a light waveguide grid including an array of waveguides coupling a respective illumination light source emitter of the general illumination device with at least one respective gap between pixel light emitters of the image display device, each waveguide having a housing including:
an input interface optically coupled to the respective illumination light source emitter to steer illumination lighting from the illumination light source emitter;
an output interface opposing the input interface and optically coupled to the at least one respective gap; and
at least one reflective wall having an internal reflective surface encompassing and extending from the input interface and the output interface;
wherein each waveguide housing is hollow and each waveguide housing further comprises:
a curved optical element positioned over the illumination light source emitter and optically coupled to the input interface of the waveguide and the illumination light source emitter to steer the illumination lighting from the illumination light source emitter through the waveguide; and
the curved optical element includes a transparent convex dome surface of the input interface that is integral with the waveguide housing, curves inwards towards the output interface, and is positioned adjacent to the illumination light source emitter.

2. The luminaire of claim 1, wherein the curved optical element is a refractive lens that focuses the illumination lighting from the illumination light source emitter.

3. The luminaire of claim 1, wherein the curved optical element is a total internal reflection (TIR) lens that includes a refractive lens inside a reflector that collimates the illumination lighting from the illumination light source emitter, and the TIR lens is integral with the illumination light source emitter and surrounds the illumination light source emitter.

4. The luminaire of claim 1, wherein each waveguide housing is formed of acrylic and hollow, and the waveguide further comprises:
a reflective film adhered to the at least one reflective wall and the output interface with a glue having a refractive index matching the acrylic forming the waveguide housing; and
wherein the reflective film adhered to the output interface has openings aligning with the gaps of the image display device.

5. The luminaire of claim 1, wherein the internal reflective surface of the at least one reflective wall is flat and colored white.

6. The luminaire of claim 1, wherein the internal reflective surface of the at least one reflective wall includes a mirror.

7. The luminaire of claim 1, wherein the internal reflective surface of the at least one reflective wall is highly diffusively reflective.

8. The luminaire of claim 1, wherein each waveguide housing includes a plurality of reflective walls, and edges of the reflective walls encompass the input interface and the output interface.

9. The luminaire of claim 8, wherein the reflective walls provide the waveguide housing with a convex shape.

10. The luminaire of claim 8, wherein the reflective walls are triangularly shaped and provide the waveguide housing with a pyramid shape.

11. The luminaire of claim 8, wherein the reflective walls provide the waveguide housing with a square or rectangular shape.

12. The luminaire of claim 8, wherein each of the reflective walls includes an external light transmissive surface to allow scattered light from adjacent illumination light source emitters to traverse the waveguide housing to reach an interior of the waveguide housing and mix with the illumination lighting emitted by the respective illumination light source emitter.

13. The luminaire of claim 1, wherein each input interface is a surface and is optically coupled to the illumination light source emitter via an aperture formed in the surface that is a square, rectangular, circular, oval, or hexagonal shaped opening.

14. The luminaire of claim 13, wherein each light extraction optical element is a diffuser formed in or coupled to the output interface of the respective waveguide and is formed of an etched frit glass, scratched glass, sanded glass, prism, lens, or sheet of diffusely transmissive material.

15. The luminaire of claim 1, further comprising:
a light extraction optical element to diffuse the illumination lighting from within each respective the waveguide out through the output interface and the at least one respective gap.

16. The luminaire of claim 15, wherein each diffuser further includes an addressable liquid crystal cell that is optically aligned with the gap to block or diffuse the illumination lighting based on an on/off state.

17. The luminaire of claim 15, wherein each output interface includes a window that is optically coupled to the diffuser.

18. The luminaire of claim 15, wherein each output interface includes a window that is optically coupled to the light extraction optical element and the at least one respective gap.

19. A luminaire comprising:
a general illumination device for illumination of a space, including:
an array of illumination light source emitters controllable to emit illumination lighting for the space;
an image display device configured to display an image, including:
a pixel matrix including an array of pixel light emitters, each pixel light emitter being controllable to emit light for a respective pixel of the displayed image;
gaps between pixel light emitters of the pixel matrix;
a light waveguide grid including an array of waveguides coupling a respective illumination light source emitter of the general illumination device with at least one respective gap between pixel light emitters of the image display device, each waveguide having a housing including:
an input interface optically coupled to the respective illumination light source emitter to steer illumination lighting from the illumination light source emitter;
an output interface opposing the input interface and optically coupled to the at least one respective gap; and
at least one reflective wall having an internal reflective surface encompassing and extending from the input interface and the output interface;
wherein:
each waveguide housing includes a plurality of reflective walls, and edges of the reflective walls encompass the input interface and the output interface; and
each of the reflective walls includes an external light absorbing surface to block incident scattered light from an adjacent illumination light source emitter that is outside the waveguide housing from reaching an interior of the waveguide housing.

20. The luminaire of claim 19, wherein the external light absorbing surface is coated with black paint and covered with adhered black tar paper or adhered black foam.

* * * * *